W. LARKIN.
RODENT POISON HOLDER.
APPLICATION FILED FEB. 19, 1912.
1,048,977.
Patented Dec. 31, 1912.
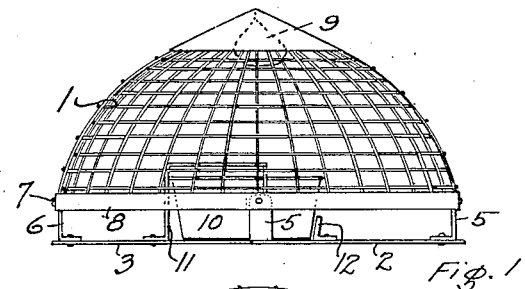
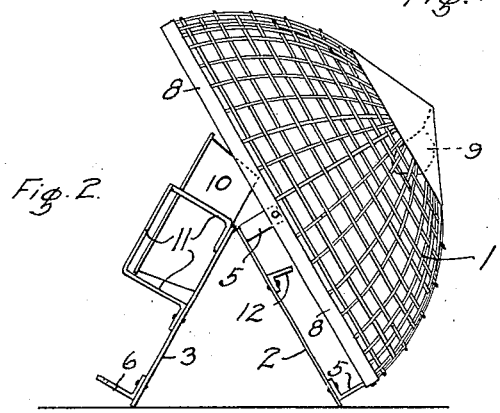
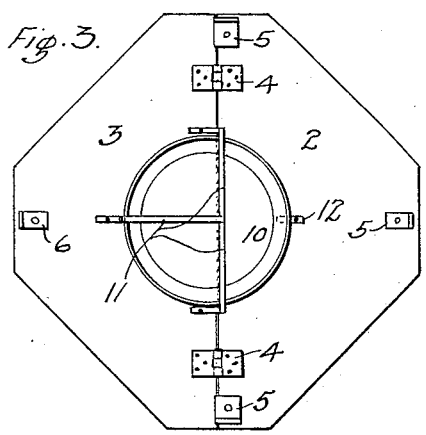
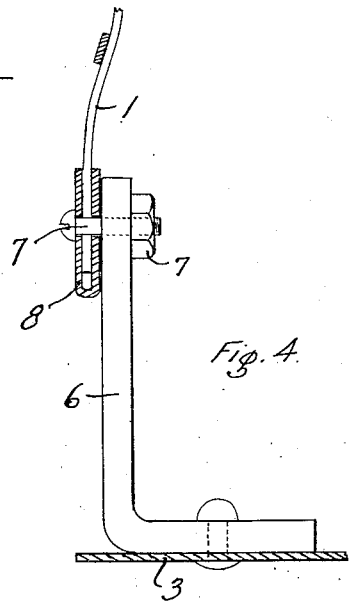
WITNESSES:
T. M. Soper
Chas. Karna
INVENTOR
William Larkin
BY
R. J. Elliott
ATTORNEY

UNITED STATES PATENT OFFICE.

WILLIAM LARKIN, OF TACOMA, WASHINGTON.

RODENT-POISON HOLDER.

1,048,977.          Specification of Letters Patent.     Patented Dec. 31, 1912.

Application filed February 19, 1912. Serial No. 678,579.

*To all whom it may concern:*

Be it known that I, WILLIAM LARKIN, a citizen of the United States, residing at Tacoma, in the county of Pierce and State of Washington, have invented a new and useful Rodent-Poison Holder, of which the following is a specification.

My invention relates to devices adapted to hold a poisonous food, and has for its object to place the food in such position that rats will readily go to it, after very slight investigation of the holder; to keep the poison out of reach of children; to protect all domestic animals from the poison; and to provide an easy means of removing the exhausted poison receptacle and to replace it with a fresh receptacle. I attain these and other objects by the devices, mechanisms, and arrangements illustrated in the accompanying drawing, in which—

Figure 1 is a side elevation of the holder in use; Fig. 2 is a similar view showing it opened to remove or replace the poison receptacle; Fig. 3 is a plan of the bottom plate of the holder, the cage having been removed; and Fig. 4 is a section of a portion of the rim of the holder, showing the removable connection between the bottom plate and the cage at the corner of the plate which turns away from the cage when it is opened.

Similar numerals of reference refer to similar parts throughout the several views.

The upper portion of the holder comprises a cage 1, or other openwork structure, which is of sufficiently small mesh to prevent the entrance thereinto of any domestic animal or of a child's arm but which is open enough to allow rats to see clearly through it. The base of the holder comprises a plate divided near its center into two parts 2 and 3 respectively, said parts being secured together by the hinges 4. The part 2 of the base is permanently secured to the cage 1, at its three corners, by means of the upturned lugs 5, but the part 3 is removably fastened to the cage 1 by a similar lug 6, secured to the part 3, and by a bolt and nut 7 passing through the lower rim 8 of the cage 1. A bag 9 is suspended within the cage 1 and holds some aniseed or other scent attraction. The receptacle 10 contains a cake of poisoned food secured therein. A three-legged bracket 11 is secured to the part 3 of the base and is adapted to receive and hold the poison receptacle 10 from movement except toward the part 2, that side being open so that the receptacle may be slid under the bracket from that side. A stop lug 12 is secured to the part 2 of the base in such position as to prevent the receptacle 10 from passing out from under the bracket 11 when the parts 2 and 3 of the base are in line.

The operation of my device may be briefly described as follows:—When it is desired to place a poisoned receptacle 10 in position (or to remove one) the bolt 7 is removed from the rim 8 and the lug 6, thus freeing the part 3 from the cage 1; then the cage 1, together with the part 2 of the base, is tilted and the part 3 turns on the hinges 4 away from the cage 1, carrying the bracket 11 and receptacle 10 with it as shown in Fig. 2; the receptacle 10 may then be placed in or removed from the bracket 11 because the edge thereof has been swung away from the stop lug 12. When the parts are again closed the bolt 7 is inserted in place and secures them together. The rats may enter between the base plate and the rim 8 and may climb all over and investigate the cage thus acquiring confidence therein.

Having described my invention, what I claim is:

In a poison-food holder, the combination of an open-bottomed cage; a base plate under substantially one-half of said cage; lugs securing said cage to said base plate and holding the cage above the base plate, thereby leaving a free space under the rim of said cage; a complementary plate, hinged to said base plate; a removable fastening means securing the complementary plate to the cage; a bracket secured to the inside of said complementary plate, adjacent said base plate and open at the side adjacent said base plate, and adapted to receive and hold a poison-food receptacle; and a stop lug secured to said base plate and adapted to engage the poison receptacle to hold it in said bracket.

WILLIAM LARKIN.

Witnesses:
A. M. RICHARDS,
T. M. SOPER.

Copies of this patent may be obtained for five cents each, by addressing the "Commissioner of Patents, Washington, D. C."